United States Patent
Plickys (10) Patent No.: US 9,328,764 B2
(45) Date of Patent: May 3, 2016

(54) FASTENING SYSTEM INCLUDING REMOVABLE STUD AND RETAINING PLATE

(71) Applicant: Hamilton Sundstrand Corporation, Windsor Locks, CT (US)

(72) Inventor: Mark R. Plickys, Unionville, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 107 days.

(21) Appl. No.: 13/932,462

(22) Filed: Jul. 1, 2013

(65) Prior Publication Data
US 2015/0003930 A1    Jan. 1, 2015

(51) Int. Cl.
*F16B 39/02* (2006.01)
*F16B 39/282* (2006.01)
*F16B 5/02* (2006.01)
*F16B 33/00* (2006.01)

(52) U.S. Cl.
CPC ............. *F16B 39/282* (2013.01); *F16B 5/0275* (2013.01); *F16B 33/002* (2013.01)

(58) Field of Classification Search
CPC .... F16B 35/04; F16B 35/042; E04F 13/0842; E04B 1/61
USPC .............. 411/92, 107, 90, 103, 85, 87, 89, 88
See application file for complete search history.

(56) References Cited

U.S. PATENT DOCUMENTS

| | | | | |
|---|---|---|---|---|
| 2,246,457 A * | 6/1941 | Schultz | ......................... | 403/217 |
| 2,400,318 A | 5/1946 | Rosan | | |
| 2,537,527 A * | 1/1951 | Heckert | ......................... | 411/92 |
| 3,862,674 A * | 1/1975 | Vananrooy | ............. | F16D 55/226 |
| | | | | 188/73.45 |
| 3,935,428 A * | 1/1976 | Itrich | ..................... | G07B 15/00 |
| | | | | 194/211 |
| 4,737,057 A * | 4/1988 | Olsson | ................... | F16B 39/101 |
| | | | | 411/100 |
| 4,893,975 A * | 1/1990 | Anthony | ......................... | 411/87 |
| 4,927,187 A | 5/1990 | Sanford et al. | | |
| 4,988,584 A | 1/1991 | Shaper | | |
| 5,011,352 A * | 4/1991 | Hatter | ..................... | B25B 13/48 |
| | | | | 411/271 |
| 5,232,323 A | 8/1993 | Baehre | | |
| 5,489,176 A * | 2/1996 | Fultz | ............................. | 411/181 |
| 5,905,771 A * | 5/1999 | Erbes | ......................... | G21C 5/10 |
| | | | | 29/402.15 |

(Continued)

FOREIGN PATENT DOCUMENTS

DE    3835543 C1    1/1990
EP    0995405 A1    4/2000

(Continued)

OTHER PUBLICATIONS

The European Search Report mailed Dec. 3, 2014 for European Application No. 14173206.5.

*Primary Examiner* — Gary Estremsky
(74) *Attorney, Agent, or Firm* — Kinney & Lange, P.A.

(57) ABSTRACT

A fastening system includes a removable stud and a retaining plate. The removable stud includes a threaded portion configured to be removably threaded into a threaded bore of a housing, a shank portion arranged coaxially with the threaded portion and configured to be inserted through a bore of a housing of a line replaceable component, and an anti-rotation portion disposed between the threaded portion and the shank portion. The retaining plate is configured to be mounted between the housing and the line replaceable component. The retaining plate includes a mating hole configured to mate with the anti-rotation portion of the removable stud.

12 Claims, 3 Drawing Sheets

(56) References Cited

U.S. PATENT DOCUMENTS

| | | | | |
|---|---|---|---|---|
| 6,220,803 | B1* | 4/2001 | Schellhase | 411/107 |
| 6,409,224 | B1* | 6/2002 | Schmidt | H02G 3/0691 |
| | | | | 285/124.3 |
| 6,546,960 | B1* | 4/2003 | Rohrberg | F16K 27/003 |
| | | | | 137/884 |
| 7,156,596 | B2* | 1/2007 | Makino | 411/34 |
| 7,922,433 | B2* | 4/2011 | Ricciardo | 411/119 |
| 2003/0118399 | A1* | 6/2003 | Schilling | F16B 5/0275 |
| | | | | 403/337 |
| 2005/0238423 | A1 | 10/2005 | Maffre | |
| 2007/0090719 | A1* | 4/2007 | Shervington | H02K 1/185 |
| | | | | 310/254.1 |
| 2008/0204350 | A1* | 8/2008 | Tam | H01Q 21/065 |
| | | | | 343/872 |

FOREIGN PATENT DOCUMENTS

| | | |
|---|---|---|
| EP | 2003349 A1 | 12/2008 |
| JP | S6121410 A | 1/1986 |
| JP | 2000266029 A | 9/2000 |
| JP | 2003294020 A | 10/2003 |

* cited by examiner

FASTENING SYSTEM INCLUDING REMOVABLE STUD AND RETAINING PLATE

STATEMENT OF GOVERNMENT INTEREST

This invention was made, at least in part, with U.S. Government support under contract number N00019-08-G-0002XT23, awarded by the United States Navy. The U.S. Government may have certain rights in this invention.

BACKGROUND

The present disclosure relates to fastening systems, and in particular to a fastening system using a removable stud and a retaining plate.

Threaded studs are commonly used to attach a line replaceable unit (LRU) to a housing of an aircraft or other aircraft components. Typically, a male portion of the stud is threaded into a mating female thread in a bore of the housing. To prevent the stud from unthreading from the bore of the housing (e.g., during prolonged periods of vibration), "keys" or other thread-deforming mechanisms are often employed to mechanically lock the stud within the bore. However, such thread-deforming anti-rotation mechanisms typically prevent the stud from being unthreaded from the bore even when it is desired to remove the stud from the housing, such as when the stud becomes damaged. Accordingly, removal and replacement of the stud can require removal of the entire housing from the aircraft to enable the stud to be removed from the bore using machining operations. Moreover, the machining operations may permanently damage the housing of the aircraft component, thereby possibly requiring replacement of a high-cost component housing. As such, removal and replacement of a "keyed" stud used to attach an LRU to a housing of an aircraft component may be costly and time consuming.

SUMMARY

In one example, a fastening system includes a removable stud and a retaining plate. The removable stud includes a threaded portion configured to be removably threaded into a threaded bore of a housing, a shank portion arranged coaxially with the threaded portion and configured to be inserted through a bore of a housing of a line replaceable component, and an anti-rotation portion disposed between the threaded portion and the shank portion. The retaining plate is configured to be mounted between the housing and the line replaceable component. The retaining plate includes a mating hole configured to mate with the anti-rotation portion of the removable stud.

In another example, a removable stud includes a threaded portion, a shank portion, and an anti-rotation portion. The threaded portion is configured to be removably threaded into a threaded bore of a housing. The shank portion is arranged coaxially with the threaded portion and configured to be inserted through a bore of a line replaceable component. The anti-rotation portion is disposed between the threaded portion and the shank portion. The anti-rotation portion is configured to mate with a mating hole of a retaining plate.

In another example, a fastening system includes a plurality of removable studs and a retaining plate. Each removable stud of the plurality of removable studs includes a threaded portion, a shank portion, and an anti-rotation portion. The threaded portion is configured to be removably threaded into a respective one of a plurality of threaded bores of a housing. The shank portion is arranged coaxially with the threaded portion and is configured to be inserted through a respective one of a plurality of bores of a housing of a line replaceable component. The anti-rotation portion is disposed between the threaded portion and the shank portion. The retaining plate is configured to be mounted between the housing and the line replaceable component. The retaining plate includes a plurality of mating holes. Each of the mating holes is configured to mate with an anti-rotation portion of a respective one of the plurality of removable studs.

DETAILED DESCRIPTION

A fastening system according to the present disclosure includes a removable stud and a retaining plate that can be used to attach a line replaceable component to a housing, such as a housing of an aircraft component. The disclosed fastening system utilizes an anti-rotation mechanism that prevents rotation of a removable stud used to attach the line replaceable component to the housing. Rather than use a thread-deforming anti-rotation mechanism (e.g., a "keying" mechanism that physically deforms the threads of the stud to mechanically lock the stud to the housing), a fastening system described herein utilizes a retaining plate that includes at least one mating hole configured to mate with an anti-rotation portion of the removable stud. In this way, the disclosed fastening system can prevent unthreading of the removable stud from the housing while the removable stud is mated with the retaining plate without deforming the threads of the stud. Accordingly, the fastening system of the present disclosure can enable "on wing" stud replacement without requiring removal of the entire component housing from the aircraft to replace a stud (e.g., when the stud becomes damaged), thereby decreasing the time and cost associated with replacing such studs.

Figure 1:
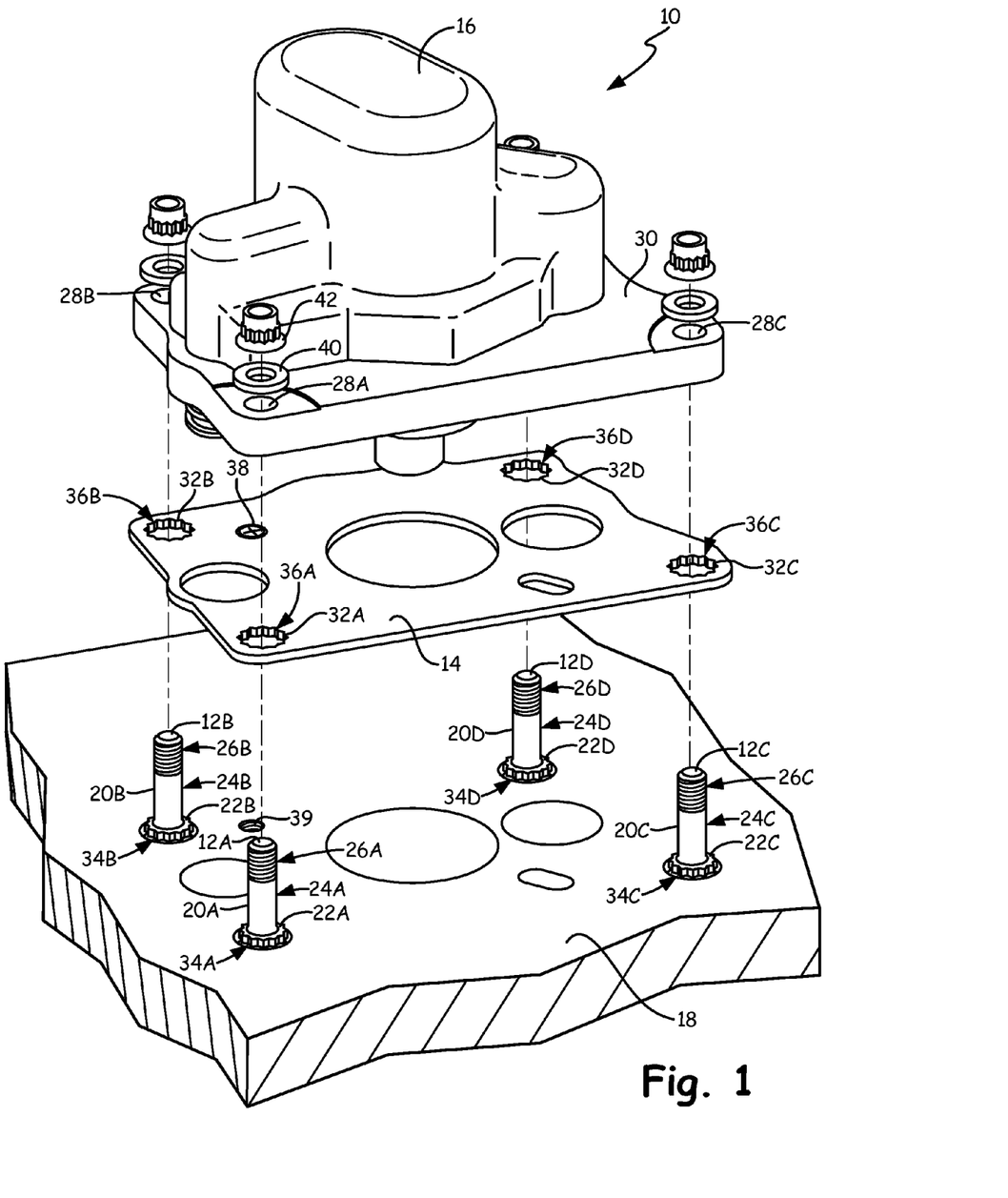
FIG. 1 is an exploded view of a fastening system including a removable stud and a retaining plate.

FIG. 1 is an exploded view of fastening system 10 including removable studs 12A, 12B, 12C, and 12D and retaining plate 14 according to one or more aspects of this disclosure. As illustrated, fastening system 10 can be used to attach line replaceable component 16 to housing 18. Housing 18 can be any type of housing to which a line replaceable component (e.g., line replaceable component 16) can be attached. For instance, in some examples, housing 18 can be a housing of a vehicle, such as an aircraft, a car, a truck, a ship, a boat, or another type of vehicle. In other examples, housing 18 may be a housing of a component mounted on a vehicle, such as a hydraulic unit mounted on an aircraft. Similarly, line replaceable component 16 can be any type of component that can be removably attached to housing 18. For instance, line replaceable component 16 can be a hydraulic pump that can be removably attached to a housing of a hydraulic unit mounted on an aircraft.

Figures 2, 3:
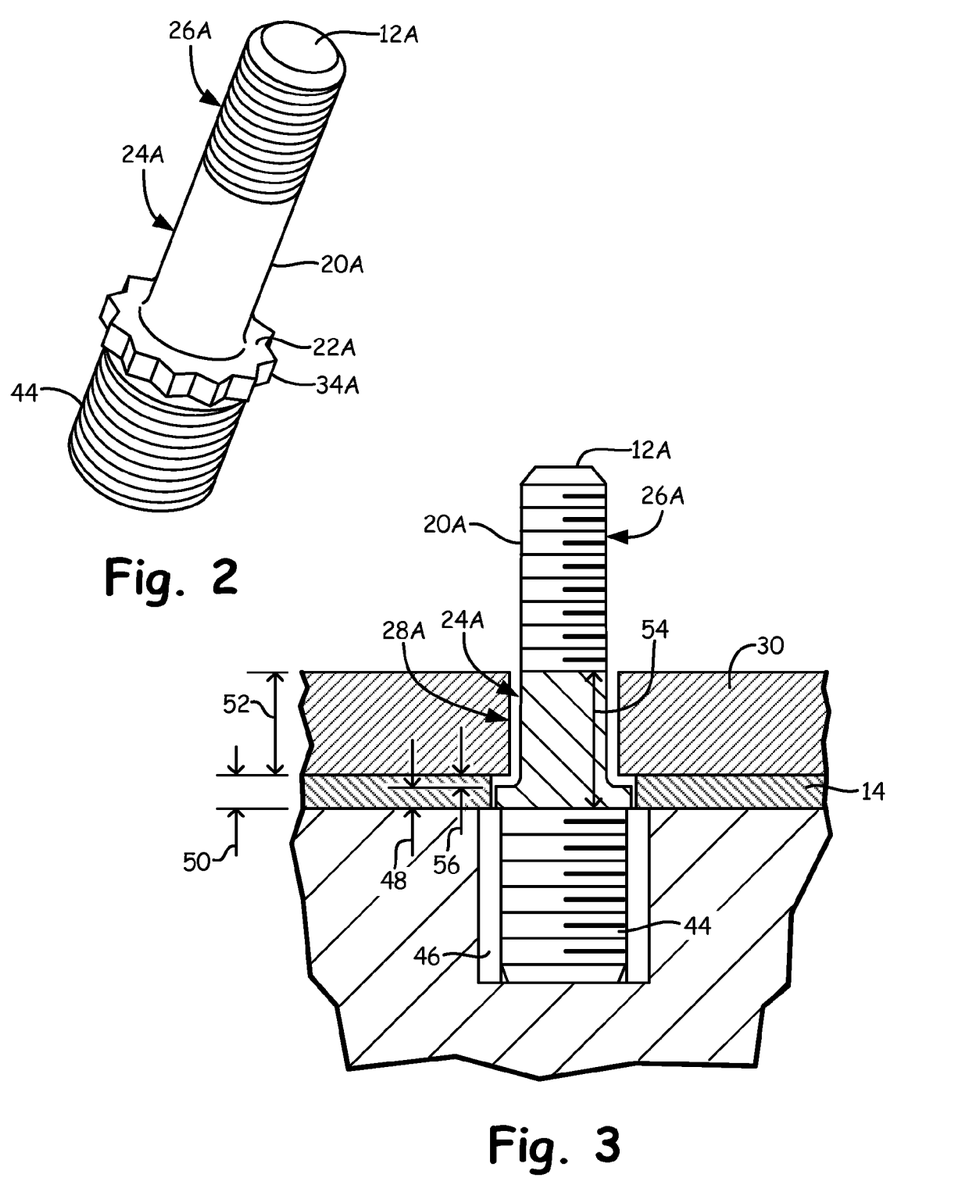
FIG. 2 is a perspective view of a removable stud of FIG. 1.
FIG. 3 is a sectional view of a portion of the fastening system of FIG. 1 taken through the middle of a removable stud.

Removable stud 12A includes shank portion 20A, anti-rotation portion 22A, and a threaded portion (illustrated in FIG. 2). Shank portion 20A extends axially from the threaded portion of removable stud 12A. Anti-rotation portion 22A is disposed between the threaded portion and shank portion 20A. The threaded portion of removable stud 12A is configured to be removably threaded into a threaded bore of housing 18 (described below in detail with respect to FIG. 3). For instance, the threaded portion of removable stud 12A can include male threads that are configured to be threadably mated into complementary female threads of the threaded bore of housing 18, such as by rotating removable stud 12A in a first direction (e.g., clockwise) to thread the threaded portion into the threaded bore and rotating removable stud 12A in a second direction (e.g., counterclockwise) to unthread the threaded portion from the threaded bore of housing 18. FIG. 1 illustrates an example in which the threaded portion of removable stud 12A is threaded into a threaded bore of housing 18.

Shank portion 20A of removable stud 12A includes unthreaded shank portion 24A proximate anti-rotation portion 22A. In addition, shank portion 20A can include threaded portion 26A extending axially from unthreaded portion 24A. Shank portion 20A can be configured to be inserted through bore 28A of housing 30 of line replaceable component 16. For example, bore 28A can have a radius adapted to receive shank portion 20A, such as a radius that is greater than a radius of shank portion 20A.

As illustrated, retaining plate 14 includes mating hole 32A and is configured to be mounted between housing 18 and line replaceable component 16. Mating hole 32A is configured to mate with anti-rotation portion 22A of removable stud 12A. For example, anti-rotation portion 22A can include one or more protrusions 34A circumferentially arranged around anti-rotation portion 22A of removable stud 12A. Mating hole 32A can include one or more voids 36A circumferentially arranged around mating hole 32A. Mating hole 32A can be configured to mate with anti-rotation portion 22A by receiving at least one of protrusions 34A in a respective one of voids 36A.

As illustrated in FIG. 1, anti-rotation portion 22A includes twelve symmetrical triangular-shaped protrusions 34A that are symmetrically arranged around the circumference of anti-rotation portion 22A. However, while illustrated in FIG. 1 as symmetrical triangular-shaped protrusions, in certain examples, protrusions 34A may have other shapes. For instance, one or more of protrusions 34A can be rectangular, semi-circular, or another shape. Similarly, protrusions 34A need not be symmetrically-shaped. For example, one or more of protrusions 34A can be non-symmetrical, such as by having a right-triangle shape or other non-symmetrical shape. In addition, in certain examples, protrusions 34A may not be symmetrically arranged around the circumference of anti-rotation portion 22A. For instance, protrusions 34A may be arranged around the circumference of anti-rotation portion 22A such that a distance between a first one of protrusions 34A and a second one of protrusions 34A is different than a distance between the second one of protrusions 34A and a third one of protrusions 34A. In some examples, anti-rotation portion 22A may include more or fewer than twelve protrusions 34A, such as one protrusion, two protrusions, six protrusions, twenty protrusions, or other numbers of protrusions.

As described above, mating hole 32A can include one or more voids 36A circumferentially arranged around mating hole 32A and configured to receive at least one of the plurality of protrusions 34A of anti-rotation portion 22A in a respective one of voids 36A. In the example of FIG. 1, mating hole 32A includes twelve voids 36A symmetrically arranged around the circumference of mating hole 32A. However, mating hole 32A can include more or fewer than twelve voids. In general, mating hole 32A can include any number of voids 36A, such that mating hole 32A is configured to mate with anti-rotation portion 22A by receiving protrusions 34A within voids 36A. For instance, in examples where anti-rotation portion 22A includes one protrusion 34A, mating hole 32A can include one, two, three, or more voids 36A, such that mating hole 32A is configured to receive the protrusion 34A within at least one of voids 36A.

In certain examples, voids 36A are configured to have a shape that is complementary to a shape of protrusions 34A. For instance, in the example of FIG. 1, each of voids 36A have a triangular shape that is complementary to each of the triangular-shaped protrusions 34A. In this way, each of voids 36A is configured to receive each of protrusions 34A by engaging an outer surface of a respective protrusion 34A with an inner surface of a respective void 36A. In operation, mating hole 32A mates with anti-rotation portion 22A of removable stud 12A by receiving each of protrusions 34A in a respective one of voids 36A such that the outer surface of each of protrusions 34A engages an inner surface of mating hole 32A within one of voids 36A.

In some examples, fastening system 10 can include a plurality of removable studs and corresponding mating holes within retaining plate 14 such that each of the mating holes within retaining plate 14 is configured to mate with an anti-rotation portion of a respective one of the plurality of removable studs. As an example, fastening system 10 can include two, three, four, five, or more removable studs and corresponding mating holes within retaining plate 14. As illustrated in FIG. 1, fastening system 10 can include removable studs 12A, 12B, 12C, and 12D, where each of removable studs 12B, 12C and 12D can be substantially similar to removable stud 12A. Housing 18 can include a plurality of threaded bores arranged within housing 18 to form a pattern, each of the threaded bores configured to threadably mate with one or more of the plurality of removable studs. Retaining plate 14 can include a plurality of mating holes that are substantially similar to mating hole 32A and arranged within retaining plate 14 to form a pattern that matches a pattern of the arrangement of the threaded bores within housing 18.

In operation, the example fastening system 10 of FIG. 1 is assembled to attach line replaceable component 16 to housing 18 by first threading each of removable studs 12A-12D (collectively referred to herein as "removable studs 12") into a corresponding threaded bore of housing 18. Mating plate 14 is mounted to abut housing 18 by mating the anti-rotation portions of each of removable studs 12 (i.e., anti-rotation portions 22A-22D) with a respective one of mating holes 32A-32D (collectively referred to herein as "mating holes 32"). That is, mating plate 14 is mounted to abut housing 18 by mating anti-rotation portion 22A of removable stud 12A with mating hole 32A. Similarly, anti-rotation portion 22B of removable stud 12B is mated with mating hole 32B, anti-rotation portion 22C of removable stud 12C is mated with mating hole 32C, and anti-rotation portion 22D of removable stud 12D is mated with mating hole 32D. In certain examples, retaining plate 14 can be secured to housing 18 by threading counter-sunk screw 38 through retaining plate 14 into corresponding threaded hole 39 within housing 18 that is configured to threadably mate with counter-sunk screw 38.

Housing 30 of line replaceable component 16 is mounted to abut retaining plate 14 by inserting each of the shank portions 20A-20D (collectively referred to herein as "shank portions 20") of removable studs 12 through a corresponding one of bores 28A-28D (collectively referred to herein as "bores 28") of housing 30 of line replaceable component 16. That is, shank portion 20A of removable stud 12A is inserted through bore 28A, shank portion 20B of removable stud 12B is inserted through bore 28B, shank portion 20C of removable stud 12C is inserted through bore 28C, and shank portion 20D of removable stud 12D is inserted through bore 28D. In some examples, fastening system 10 can include one or more washers and nuts configured to secure housing 30 to removable studs 12. For example, fastening system 10 can include washer 40 and nut 42. In the example of FIG. 1, washer 40 (e.g., a self-locking washer) is configured to be mounted between housing 30 and nut 42 (e.g., a self-locking nut). Nut 42 is configured to be threaded onto threaded shank portion 26A of removable stud 12A to secure the assembly of housing 18, retaining plate 14, and housing 30. As illustrated, system 10 can include a plurality of washers and nuts that can be substantially similar to washer 40 and nut 42.

According to techniques disclosed herein, fastening system 10 includes one or more removable studs 12 and retaining plate 14 that can be used to secure line replaceable component 16 (e.g., a pump, a motor, and the like) to housing 18 (e.g., a housing of an aircraft component, such as a hydraulic unit mounted to an aircraft). Rather than utilize a "keying" or other thread-deforming mechanism to prevent unthreading of removable studs 12 from housing 18 (e.g., during periods of vibration), fastening system 10 includes retaining plate 14 configured to be mounted between housing 18 and line replaceable component 16 and having retaining holes 32 configured to mate with anti-rotation portions 22 of removable studs 12. In this way, fastening system 10 can prevent rotation of any one of removable studs 12 without deforming or otherwise damaging the removable studs. Accordingly, fastening system 10 can enable time-efficient and cost-effective "on wing" replacement of any one of removable studs 12, such as by removing line replaceable component 16 from housing 18, unthreading one or more of removable studs 12, threading a replacement stud into the corresponding threaded bore of housing 18, and reassembling fastening system 10.

FIG. 2 is a perspective view of removable stud 12A of FIG. 1. As illustrated in FIG. 2, removable stud 12A includes threaded portion 44, shank portion 20A, and anti-rotation portion 22A. Shank portion 20A includes unthreaded shank portion 24A and threaded shank portion 26A. Threaded portion 44 is configured to be removably threaded into a threaded bore of a housing, such as by rotating removable stud 12A in a first direction (e.g., clockwise) to engage male threads of threaded portion 44 with complementary female threads of the threaded bore. Similarly, threaded portion 44 is configured to be unthreaded from the threaded bore of the housing, such as by rotating removable stud 12A in a second direction (e.g., counterclockwise).

Shank portion 20A extends axially from threaded portion 44. Anti-rotation portion 22A is disposed between threaded portion 44 and shank portion 20A. As illustrated, anti-rotation portion 22A includes protrusions 34A circumferentially arranged around removable stud 12A, as was described above with respect to FIG. 1. Unthreaded shank portion 24A extends axially along shank portion 20A from a location proximate anti-rotation portion 22A to a location proximate threaded shank portion 26A. Threaded shank portion can include male threads configured to mate with a nut, such as nut 42 of FIG. 1.

FIG. 3 is a sectional view of a portion of fastening system 10 of FIG. 1 taken through the middle of removable stud 12A. As illustrated in FIG. 3, fastening system 10 can include removable stud 12A and retaining plate 14. Removable stud 12A includes threaded portion 44, shank portion 20A, and anti-rotation portion 22A. Shank portion 20A includes unthreaded shank portion 24A coaxially arranged with anti-rotation portion 22A and threaded shank portion 26A coaxially arranged with unthreaded portion 24A.

In the example of FIG. 3, fastening system 10 is assembled such that threaded portion 44 is threaded into threaded bore 46 of housing 18, retaining plate 14 is mounted between housing 18 and housing 30, and shank portion 20A is inserted within bore 28A. As illustrated, anti-rotation portion 22A has first thickness 48, retaining plate 14 has second thickness 50, and bore 28A has third thickness 52. In this example, second thickness 50 of retaining plate 14 is greater than first thickness 48 of anti-rotation portion 22A, thereby defining gap 56 between anti-rotation portion 22A and housing 30 and helping to ensure that retaining plate 14, rather than anti-rotation portion 22A, bears the load of housing 30. In addition, unthreaded shank portion 24A has a length 54 that is greater than or equal to a value equal to a sum of second thickness 50 and third thickness 52 less first thickness 48. Accordingly, unthreaded shank portion 24A has a length that is configured to extend through bore 28A, thereby helping to ensure that threaded shank portion 26A is not subjected to the load of housing 30 while fastening system 10 is in an assembled state.

Figure 4:
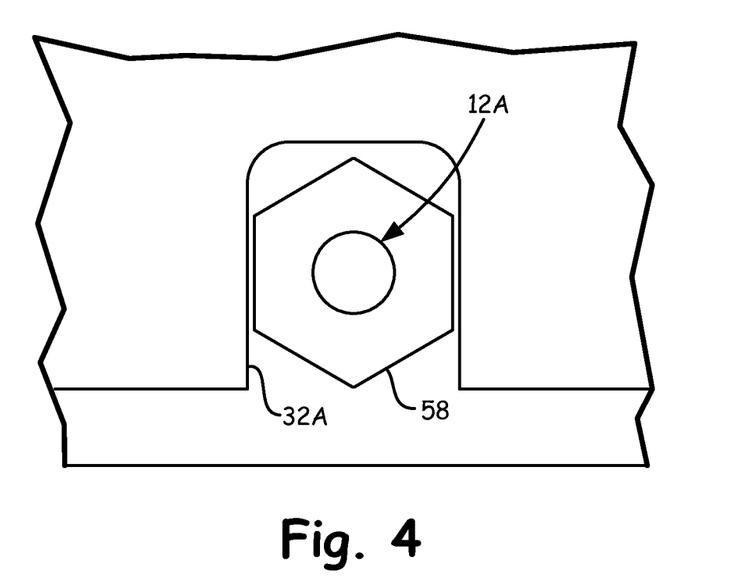
FIG. 4 is a top view of an alternative embodiment of a removable stud and a retaining plate.

FIG. 4 is a top view of an alternative embodiment of removable stud 12A and retaining plate 14 of FIG. 1. In this embodiment, removable stud 12A includes anti-rotation portion 58. As illustrated, anti-rotation portion 58 includes a hexagonal shape. Mating hole 32A, in this example, includes a slot-shaped opening and is configured to mate with anti-rotation portion 58 by receiving anti-rotation portion 58 such that two faces of anti-rotation portion 58 engage an inner surface of mating hole 32A in an assembled state.

Figure 5:
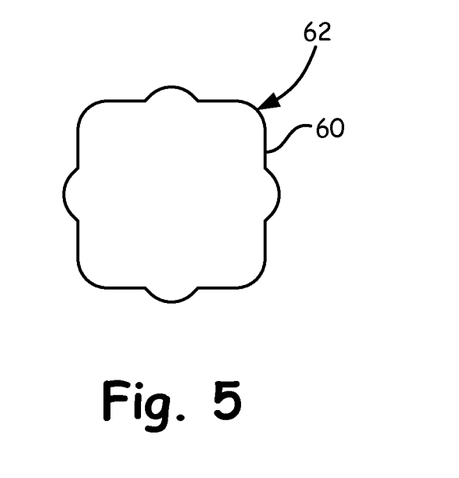
FIG. 5 is a top view of an alternative embodiment of an anti-rotation portion of a removable stud.

FIG. 5 is a top view of an alternative embodiment of an anti-rotation portion of removable stud 12A of FIG. 1. In this embodiment, anti-rotation portion 60 includes eight protrusions 62 arranged around a circumference of anti-rotation portion 60. In this embodiment, a mating hole configured to mate with anti-rotation portion 60 can include a plurality of voids, each of the voids having a complementary shape to a respective one of protrusions 62.

As described herein, fastening system 10 includes one or more removable studs 12 and retaining plate 14 that can be used to attach line replaceable component 16 to housing 18. According to techniques of this disclosure, fastening system 10 can prevent rotation of any one of removable studs 12 without utilizing a thread-deforming mechanism. In this way, fastening system 10 can enable cost-effective and timely "on wing" replacement of removable studs 12 by enabling removable studs 12 to be unthreaded from housing 18 without the use of machining operations.

The following are non-exclusive descriptions of embodiments of the present disclosure.

A fastening system includes a removable stud and a retaining plate. The removable stud includes a threaded portion configured to be removably threaded into a threaded bore of a housing, a shank portion arranged coaxially with the threaded portion and configured to be inserted through a bore of a housing of a line replaceable component, and an anti-rotation portion disposed between the threaded portion and the shank portion. The retaining plate is configured to be mounted between the housing and the line replaceable component. The retaining plate includes a mating hole configured to mate with the anti-rotation portion of the removable stud.

The fastening system of the preceding paragraph can optionally include, additionally and/or alternatively, any one or more of the following features, configurations, and/or additional components:

The anti-rotation portion of the removable stud may include a plurality of protrusions circumferentially arranged around the removable stud. The mating hole of the retaining plate may include a plurality of voids circumferentially arranged around the mating hole. The mating hole of the retaining plate may be configured to mate with the anti-rotation portion of the removable stud by receiving at least one of the plurality of protrusions of the anti-rotation portion of the removable stud in a respective one of the plurality of voids of the mating hole.

Each protrusion of the plurality of protrusions of the anti-rotation portion of the removable stud may include a triangular-shaped protrusion. Each void of the plurality of voids of the mating hole may include a triangular-shaped void that is complementary to each of the triangular-shaped protrusions of the anti-rotation portion of the removable stud.

Each protrusion of the plurality of protrusions may be symmetrical.

The plurality of protrusions of the anti-rotation portion may be symmetrically arranged around the removable stud.

The anti-rotation portion of the removable stud may have a first thickness. The retaining plate may have a second thickness that is greater than the first thickness of the anti-rotation portion.

The shank portion of the removable stud may further include an unthreaded portion coaxially arranged with the anti-rotation portion, and a threaded portion coaxially arranged with the unthreaded portion.

The anti-rotation portion may have a first thickness. The retaining plate may have a second thickness that is greater than the first thickness. The bore of the housing of the line replaceable component may have a third thickness. The unthreaded portion of the shank portion of the removable stud may have a length that is greater than or equal to a value equal to a sum of the second thickness and the third thickness less the first thickness.

The fastening system may further include a self-locking washer and a self-locking nut. The self-locking washer may be configured to be mounted between the housing of the line replaceable component and the self-locking nut. The self-locking nut may be configured to be threaded onto the threaded portion of the shank portion of the removable stud.

A removable stud includes a threaded portion, a shank portion, and an anti-rotation portion. The threaded portion is configured to be removably threaded into a threaded bore of a housing. The shank portion is arranged coaxially with the threaded portion and configured to be inserted through a bore of a line replaceable component. The anti-rotation portion is disposed between the threaded portion and the shank portion. The anti-rotation portion is configured to mate with a mating hole of a retaining plate.

The removable stud of the preceding paragraph can optionally include, additionally and/or alternatively, any one or more of the following features, configurations, and/or additional components:

The anti-rotation portion of the removable stud may include a plurality of protrusions circumferentially arranged around the removable stud and configured to mate with a plurality of voids circumferentially arranged around the mating hole of the retaining plate.

Each protrusion of the plurality of protrusions of the anti-rotation portion of the removable stud may include a triangular-shaped protrusion configured to mate with a respective triangular-shaped protrusion of the plurality of voids of the mating hole of the retaining plate.

Each protrusion of the plurality of protrusions may be symmetrical.

The plurality of protrusions of the anti-rotation portion may be symmetrically arranged around the removable stud.

A fastening system includes a plurality of removable studs and a retaining plate. Each removable stud of the plurality of removable studs includes a threaded portion, a shank portion, and an anti-rotation portion. The threaded portion is configured to be removably threaded into a respective one of a plurality of threaded bores of a housing. The shank portion is arranged coaxially with the threaded portion and is configured to be inserted through a respective one of a plurality of bores of a housing of a line replaceable component. The anti-rotation portion is disposed between the threaded portion and the shank portion. The retaining plate is configured to be mounted between the housing and the line replaceable component. The retaining plate includes a plurality of mating holes. Each of the mating holes is configured to mate with an anti-rotation portion of a respective one of the plurality of removable studs.

The fastening system of the preceding paragraph can optionally include, additionally and/or alternatively, any one or more of the following features, configurations, and/or additional components:

The plurality of mating holes of the retaining plate may be arranged within the retaining plate to form a pattern of mating holes. The plurality of threaded bores of the housing may be arranged within the housing to form a pattern of threaded bores. The pattern of mating holes may be configured to match the pattern of threaded bores.

The anti-rotation portion of each removable stud of the plurality of removable studs may include a plurality of protrusions circumferentially arranged around the respective removable stud. Each mating hole of the plurality of mating holes of the retaining plate may include a plurality of voids circumferentially arranged around the respective mating hole. Each mating hole of the plurality of mating holes of the retaining plate may be configured to mate with the anti-rotation portion of a respective one of the plurality of removable studs by receiving at least one of the plurality of protrusions of the anti-rotation portion of the respective one of the plurality of removable studs in a respective one of the plurality of voids of the respective mating hole.

Each protrusion of the plurality of protrusions of the anti-rotation portion of each of the plurality of removable studs may include a triangular-shaped protrusion. Each void of the plurality of voids of each of the plurality of mating holes of the retaining plate may include a triangular-shaped void that is complementary to each of the triangular-shaped protrusions of the plurality of triangular-shaped protrusions of the anti-rotation portion of each of the plurality of removable studs.

Each protrusion of the plurality of protrusions of each of the plurality of removable studs may be symmetrical.

The plurality of protrusions of each the anti-rotation portion of each of the plurality of removable studs may be symmetrically arranged around a respective one of the plurality of removable studs.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fastening system comprising:
   a first housing of a line replaceable component, the first housing of the line replaceable component comprising a bore having a depth;
   a removable stud comprising:
      a threaded portion configured to be removably threaded into a threaded bore of a second housing;
      a shank portion arranged coaxially with the threaded portion and configured to be inserted through the bore of the first housing of the line replaceable component; and
      an anti-rotation portion disposed between the threaded portion and the shank portion and abutting threads of the threaded portion, the anti-rotation portion having a first thickness,
      wherein the shank portion further comprises an unthreaded portion coaxially arranged with the anti-rotation portion and a threaded portion coaxially arranged with the unthreaded portion; and
   a retaining plate configured to be mounted between the second housing and the first housing of the line replaceable component, the retaining plate having a second thickness that is greater than the first thickness of the anti-rotation portion and comprising a mating hole configured to mate with the anti-rotation portion of the removable stud,
   wherein the unthreaded portion of the shank portion of the removable stud has a length that is greater than or equal to a sum of the second thickness and the depth of the bore of the first housing of the line replaceable component less the first thickness.

2. The fastening system of claim 1,
   wherein the anti-rotation portion of the removable stud comprises a plurality of protrusions circumferentially arranged around the removable stud,
   wherein the mating hole of the retaining plate comprises a plurality of voids circumferentially arranged around the mating hole, and
   wherein the mating hole of the retaining plate is configured to mate with the anti-rotation portion of the removable stud by receiving at least one of the plurality of protrusions of the anti-rotation portion of the removable stud in a respective one of the plurality of voids of the mating hole.

3. The fastening system of claim 2,
   wherein each protrusion of the plurality of protrusions of the anti-rotation portion of the removable stud comprises a triangular-shaped protrusion, and
   wherein each void of the plurality of voids of the mating hole comprises a triangular-shaped void that is complementary to each of the triangular-shaped protrusions of the anti-rotation portion of the removable stud.

4. The fastening system of claim 2, wherein each protrusion of the plurality of protrusions is symmetrical.

5. The fastening system of claim 2, wherein the plurality of protrusions of the anti-rotation portion are symmetrically arranged around the removable stud.

6. The fastening system of claim 1, further comprising:
   a self-locking washer; and
   a self-locking nut,
   wherein the self-locking washer is configured to be mounted between the first housing of the line replaceable component and the self-locking nut, and
   wherein the self-locking nut is configured to be threaded onto the threaded portion of the shank portion of the removable stud.

7. A fastening system comprising:
   a first housing of a line replaceable component, the first housing of the line replaceable component comprising a plurality of bores, each having a respective depth;
   a plurality of removable studs, each removable stud of the plurality of removable studs comprising:
      a threaded portion configured to be removably threaded into a respective one of a plurality of threaded bores of a second housing;
      a shank portion arranged coaxially with the threaded portion and configured to be inserted through a respective one of the plurality of bores of the first housing of the line replaceable component; and
      an anti-rotation portion disposed between the threaded portion and the shank portion and abutting threads of the threaded portion, the anti-rotation portion having a first thickness;
      wherein the shank portion further comprises an unthreaded portion coaxially arranged with the anti-rotation portion and a threaded portion coaxially arranged with the unthreaded portion; and
   a retaining plate configured to be mounted between the second housing and the first housing of the line replaceable component, the retaining plate having a second thickness that is greater than the first thickness of the anti-rotation portion and comprising a plurality of mating holes, each of the plurality of mating holes configured to mate with an anti-rotation portion of a respective one of the plurality of removable studs,
   wherein the unthreaded portion of the shank portion of each of the plurality of removable studs has a length that is greater than or equal to a sum of the second thickness and the depth of the respective one of the plurality of bores of the first housing of the line replaceable component less the first thickness.

8. The fastening system of claim 7,
   wherein the plurality of mating holes of the retaining plate are arranged within the retaining plate to form a pattern of mating holes,
   wherein the plurality of bores of the first housing are arranged within the first housing to form a pattern of bores, and
   wherein the pattern of mating holes is configured to match the pattern of bores.

9. The fastening system of claim 7,
   wherein the anti-rotation portion of each removable stud of the plurality of removable studs comprises a plurality of protrusions circumferentially arranged around the respective removable stud,
   wherein each mating hole of the plurality of mating holes of the retaining plate comprises a plurality of voids circumferentially arranged around the respective mating hole, and
   wherein each mating hole of the plurality of mating holes of the retaining plate is configured to mate with the anti-rotation portion of a respective one of the plurality of removable studs by receiving at least one of the plurality of protrusions of the anti-rotation portion of the respective one of the plurality of removable studs in a respective one of the plurality of voids of the respective mating hole.

10. The fastening system of claim 9,
    wherein each protrusion of the plurality of protrusions of the anti-rotation portion of each of the plurality of removable studs comprises a triangular-shaped protrusion, and wherein each void of the plurality of voids of each of the plurality of mating holes of the retaining plate comprises a triangular-shaped void that is complementary to each of the triangular-shaped protrusions of the plurality of triangular-shaped protrusions of the anti-rotation portion of each of the plurality of removable studs.

11. The fastening system of claim 9, wherein each protrusion of the plurality of protrusions of each of the plurality of removable studs is symmetrical.

12. The fastening system of claim 9, wherein the plurality of protrusions of each the anti-rotation portion of each of the plurality of removable studs are symmetrically arranged around a respective one of the plurality of removable studs.

* * * * *